US009007000B2

(12) United States Patent
Szczeszynski et al.

(10) Patent No.: US 9,007,000 B2
(45) Date of Patent: Apr. 14, 2015

(54) ELECTRONIC CIRCUITS FOR DRIVING SERIES CONNECTED LIGHT EMITTING DIODE STRINGS

(71) Applicant: Allegro MicroSystems, LLC, Worcester, MA (US)

(72) Inventors: Gregory Szczeszynski, Hollis, NH (US); Bassem Alnahas, Manchester, NH (US); Vijay Mangtani, Nashua, NH (US)

(73) Assignee: Allegro MicroSystems, LLC, Worcester, MA (US)

( * ) Notice: Subject to any disclaimer, the term of this patent is extended or adjusted under 35 U.S.C. 154(b) by 0 days.

(21) Appl. No.: 14/149,167

(22) Filed: Jan. 7, 2014

(65) Prior Publication Data

US 2014/0125236 A1 May 8, 2014

Related U.S. Application Data

(62) Division of application No. 13/428,654, filed on Mar. 23, 2012, now Pat. No. 8,653,756, which is a division of application No. 12/267,645, filed on Nov. 10, 2008, now Pat. No. 8,169,161.

(60) Provisional application No. 60/988,520, filed on Nov. 16, 2007.

(51) Int. Cl.
*H05B 37/02* (2006.01)
*H05B 33/08* (2006.01)

(52) U.S. Cl.
CPC ........ *H05B 33/0818* (2013.01); *H05B 33/0815* (2013.01); *H05B 33/0827* (2013.01)

(58) Field of Classification Search
USPC .......... 315/185 R, 185 S, 224–225, 246–247, 315/291, 294–295, 297–302, 306–311, 312, 315/314, 324
See application file for complete search history.

(56) References Cited

U.S. PATENT DOCUMENTS

| 4,739,226 | A  | 4/1988  | Murata |
| 6,222,385 | B1 | 4/2001  | Kang |
| 6,621,235 | B2 | 9/2003  | Chang |
| 6,636,104 | B2 | 10/2003 | Henry |
| 6,690,146 | B2 | 2/2004  | Burgyan et al. |
| 6,822,403 | B2 | 11/2004 | Horiuchi et al. |
| 6,930,679 | B2 | 8/2005  | Wu et al. |
| 6,963,175 | B2 | 11/2005 | Archenhold et al. |

(Continued)

FOREIGN PATENT DOCUMENTS

| EP | 1 079 667 A2 | 2/2001 |
| EP | 1 079 667 A3 | 2/2001 |

(Continued)

OTHER PUBLICATIONS

Allegro Microsystems, Inc. A8432 and A8433 Data Sheets; WLED Backlight Drivers with True Shutdown and OVP; Jan. 25, 2005; pp. 1-5.

(Continued)

*Primary Examiner* — Jany Richardson
(74) *Attorney, Agent, or Firm* — Daly, Crowley, Mofford & Durkee, LLP

(57) ABSTRACT

Electronic circuits provide an error signal to control a regulated output voltage signal generated by a controllable DC-DC converter for driving one or more series connected strings of light emitting diodes.

16 Claims, 7 Drawing Sheets

(56) References Cited

U.S. PATENT DOCUMENTS

| | | |
|---|---|---|
| 7,116,086 B2 | 10/2006 | Burgyan et al. |
| 7,129,679 B2 | 10/2006 | Inaba et al. |
| 7,148,632 B2 | 12/2006 | Berman et al. |
| 7,235,954 B2 | 6/2007 | Murakami |
| 7,291,989 B2 | 11/2007 | Namba et al. |
| 7,307,614 B2 | 12/2007 | Vinn et al. |
| 7,317,403 B2 | 1/2008 | Grootes et al. |
| 7,375,472 B2 | 5/2008 | Wong et al. |
| 7,466,082 B1 | 12/2008 | Snyder et al. |
| 7,479,743 B2 | 1/2009 | Namba et al. |
| 7,482,765 B2 | 1/2009 | Ito et al. |
| 7,528,551 B2 | 5/2009 | Ball |
| 7,675,245 B2 | 3/2010 | Szczeszynski et al. |
| 7,675,246 B2 | 3/2010 | Chiang et al. |
| 7,928,670 B2 | 4/2011 | Chen et al. |
| 7,999,487 B2 | 8/2011 | Szczeszynski |
| 8,169,161 B2 | 5/2012 | Szczeszynski et al. |
| 8,274,238 B2 | 9/2012 | Szczeszynski et al. |
| 8,482,225 B2 | 7/2013 | Szczeszynski |
| 8,653,756 B2 | 2/2014 | Szczeszynski et al. |
| 2004/0051478 A1 | 3/2004 | Otake et al. |
| 2004/0080273 A1 | 4/2004 | Ito et al. |
| 2004/0251854 A1 | 12/2004 | Matsuda et al. |
| 2004/0251942 A1 | 12/2004 | Chiu et al. |
| 2005/0088207 A1 | 4/2005 | Rader et al. |
| 2005/0104542 A1 | 5/2005 | Ito et al. |
| 2005/0110469 A1 | 5/2005 | Inaba et al. |
| 2005/0156540 A1 | 7/2005 | Ball |
| 2005/0243022 A1 | 11/2005 | Negru |
| 2005/0243041 A1 | 11/2005 | Vinn |
| 2006/0022916 A1 | 2/2006 | Aiello |
| 2006/0028147 A1 | 2/2006 | Shinmen et al. |
| 2006/0114954 A1 | 6/2006 | Wong et al. |
| 2006/0125320 A1 | 6/2006 | Namba et al. |
| 2006/0139299 A1 | 6/2006 | Tsuchiya |
| 2006/0170287 A1 | 8/2006 | Ito et al. |
| 2006/0250824 A1 | 11/2006 | Wekhande et al. |
| 2007/0120506 A1 | 5/2007 | Grant |
| 2007/0182701 A1 | 8/2007 | Kim et al. |
| 2007/0267978 A1 | 11/2007 | Shteynberg et al. |
| 2008/0048573 A1 | 2/2008 | Ferentz et al. |
| 2008/0144236 A1 | 6/2008 | Chiang et al. |
| 2008/0164828 A1 | 7/2008 | Szczeszynski et al. |
| 2009/0021384 A1 | 1/2009 | Jacubovski et al. |
| 2009/0195183 A1 | 8/2009 | Yang |
| 2009/0212717 A1 | 8/2009 | Trattler |
| 2009/0289559 A1 | 11/2009 | Tanaka et al. |
| 2010/0052552 A1 | 3/2010 | Kimura |
| 2010/0060177 A1 | 3/2010 | Takata et al. |
| 2010/0066255 A1 | 3/2010 | Roberts |
| 2010/0072922 A1 | 3/2010 | Szczeszynski et al. |
| 2010/0109550 A1 | 5/2010 | Huda et al. |
| 2010/0164581 A1 | 7/2010 | Zhang et al. |
| 2010/0207547 A1 | 8/2010 | Kuroki et al. |
| 2010/0259177 A1 | 10/2010 | Mednik et al. |
| 2010/0327835 A1 | 12/2010 | Archibald |
| 2011/0026277 A1 | 2/2011 | Strijker |
| 2011/0032008 A1 | 2/2011 | Zhao et al. |
| 2011/0062929 A1 | 3/2011 | Strydom et al. |
| 2011/0204947 A1 | 8/2011 | Qiu et al. |
| 2011/0234122 A1 | 9/2011 | Yu et al. |
| 2011/0298384 A1 | 12/2011 | Tanigawa et al. |
| 2012/0133299 A1 | 5/2012 | Capodivacca et al. |
| 2012/0146541 A1 | 6/2012 | Szczeszynski et al. |
| 2012/0181939 A1 | 7/2012 | Szczeszynski et al. |
| 2013/0009556 A1 | 1/2013 | Szczeszynski et al. |
| 2013/0009557 A1 | 1/2013 | Szczeszynski |
| 2013/0162152 A1 | 6/2013 | Lee et al. |
| 2013/0207632 A1 | 8/2013 | Thandi et al. |
| 2014/0055045 A1 | 2/2014 | Raval et al. |

FOREIGN PATENT DOCUMENTS

| | | |
|---|---|---|
| EP | 1 499 165 A2 | 1/2005 |
| JP | 3-196280 | 8/1991 |
| JP | H06-044807 | 2/1994 |
| JP | H11-507750 A | 7/1999 |
| JP | 2002-257871 A | 9/2002 |
| JP | 2002-281345 A | 9/2002 |
| JP | 2003-063062 | 3/2003 |
| JP | 2003-215534 | 7/2003 |
| JP | 2004-134147 | 4/2004 |
| JP | 2004-134147 A | 4/2004 |
| JP | 2005-116738 A | 4/2005 |
| JP | 2006-116738 | 4/2005 |
| JP | 2005-122979 | 5/2005 |
| JP | 2006-005381 | 1/2006 |
| JP | 3755770 B2 | 3/2006 |
| JP | 2006-158186 A | 6/2006 |
| JP | 2006-185942 | 7/2006 |
| JP | 2006-521659 A | 9/2006 |
| JP | 2006-318326 A | 11/2006 |
| JP | 2005-122979 | 5/2007 |
| JP | 2007-120506 | 5/2007 |
| JP | 2007-129862 | 5/2007 |
| JP | 2008-311602 A | 12/2008 |
| KR | 10-2005-0006042 | 1/2005 |
| WO | WO 00/13310 | 3/2000 |
| WO | WO 02/03087 A1 | 1/2002 |
| WO | WO 2006/136321 A1 | 12/2006 |
| WO | WO 2007/043389 A1 | 4/2007 |
| WO | WO 2007/096868 A1 | 8/2007 |
| WO | WO 2007/126630 A2 | 11/2007 |
| WO | WO 2007/126630 A3 | 11/2007 |
| WO | WO 2008/086050 A2 | 7/2008 |
| WO | WO 2008/086050 A3 | 7/2008 |
| WO | WO 2009/064682 A2 | 5/2009 |
| WO | WO 2009/064682 A3 | 5/2009 |
| WO | WO 2010/000475 A1 | 1/2010 |
| WO | WO 2013/006272 A1 | 1/2013 |

OTHER PUBLICATIONS

Allegro Microsystems, Inc.; A8500 Data Sheet; "Flexible WLED/RGB Backlight Driver for Medium Size LCD's," Dec. 8, 2006; pp. 1-15.

Bakker et al.; "A CMOS Nested-Chopper Instrumentation Amplifier with 100-nV Offset;" IEEE Journal of Solid-State Circuits; vol. 35, No. 12; Dec. 2000; pp. 1877-1883.

Burkhart et al.; "A Monolithically Integrated 128 LED-Driver and its Application," IEEE Transactions on Consumer Electronics; vol. CE-32, No. 1; Feb. 1986; pp. 26-31.

Linear Technology; Design Note 154; Short-Circuit Protection for Boost Regulators, 1997; pp. 1-2.

MAXIM Data Sheet; MAX1570; "White LED Current Regulator with 1x/1.5x High-Efficiency Charge Pump;" #19-2526; Jul. 2002; pp. 1-12.

MAXIM Data Sheet; MAX1574; "180mA, 1x/2x, White LED Charge Pump in 3mm x 3mm TDFN," #19-3117; Dec. 2003; pp. 1-9.

MAXIM Data Sheet; MAX1576; "480mA White LED 1x/1.5x./2x Charge Pump for Backlighting and Camera Flash," #19-3326; Aug. 2005; pp. 1-14.

MAXIM, Data Sheet MAX16807/MAX16808, Integrated 8-Channel LED Drivers with Switch-Mode boost and SEPIC Controller, Oct. 2006, pp. 1-21.

MAXIM; Dallas Semiconductor; "Charge-Pump and Step-Up DC-DC Converter Solutions for Powering White LEDs in Series or Parallel Connection;" Apr. 23, 2002; 15 pages.

Nippon Precision Circuits, Inc.; SM8132A; "White LED Driver IC;" Nippon Precision Circuits, Inc.; May 2005, pp. 1-18.

Rohm, Data Sheet BD6066GU, Silicon Monolithic Integrated Circuit, Apr. 2005, pp. 1-6.

Office Action dated Nov. 8, 2011; for U.S. Appl. No. 12/629,374; 18 pages.

Response to Office Action filed Feb. 15, 2012; for Office Action dated Nov. 8, 2011; for U.S. Appl. No. 12/629,374; 9 pages.

(56) References Cited

OTHER PUBLICATIONS

U.S. Office Action dated Dec. 21, 2010 from U.S. Appl. No. 12/136,347; 25 pages.
Response to Office Action dated Dec. 21, 2010; for U.S. Appl. No. 12/136,347; 16 pages.
Notice of Allowance dated May 9, 2011; for U.S. Appl. No. 12/136,347 8 pages.
Office Action dated Sep. 1, 2011; for U.S. Appl. No. 12/267,645; 24 pages.
Response filed Nov. 14, 2011; to U.S. Appl. No. 12/267,645; 7 pages.
Notice of Allowance dated Jan. 11, 2012; for U.S. Appl. No. 12/267,645; 10 pages.
312 Amendment filed Mar. 7, 2012; for U.S. Appl. No. 12/267,645; 4 pages.
Response to 312 Amendment filed Mar. 7, 2012; for U.S. Appl. No. 12/267,645; 2 pages.
Office Action; dated Apr. 25, 2013; for U.S. Appl. No. 12/966,139; 20 pages.
Response to Office Action filed Jul. 24, 2013; to Office Action; dated Apr. 25, 2013; for U.S. Appl. No. 12/966,139; 11 pages.
Notice of Allowance dated Sep. 17, 2013; for U.S. Appl. No. 12/966,139; 16 pages.
Request for Continued Examination dated Oct. 29, 2013; for U.S. Appl. No. 12/966,139; 3 pages.
Notice of Allowance dated Nov. 12, 2013; for U.S. Appl. No. 12/966,139; 12 pages.
Taiwan Office Action and Search Report (in English); received Apr. 30, 2013; for TW Pat. App. No. 097144152; 15 pages.
Response to Taiwanese Office Action (with Claims in English): filed Jul. 11, 2013; for TW Pat. App. No. 097144152; 7 pages.
Taiwan Allowance Decision of Examination; dated Aug. 30, 2013; for Taiwanese Pat. App. No. 097144152; 2 pages.
Email from Taiwan International Patent & Law Office; dated Sep. 5, 2013; for Taiwanese Pat. App. No. 097144152; 2 pages.
Japanese Notice of Rejection; dated Feb. 21, 2013; for JP Pat. App. No. 2010-534111; 4 pages.
JP Response to Office Action (with English translation of claims); filed May 20, 2013; for JP Pat. App. No. 2010-534111; 13 pages.
Letter from Yuasa and Hara; dated Jul. 8, 2013; for JP Pat. App. No. 2010-534111; 2 pages.
Japanese Notice of Reasons for Rejection (English Translation): dated Aug. 1, 2013; for Japanese Pat. App. No. 2010-234111; 2 pages.
Letter to Yuasa and Hare; dated Oct. 4, 2013; for Japanese Pat. App. No. 2010-534111; 3 pages.
Japanese Response filed Oct. 11, 2013; for Japanese Pat. App. No. 2010-534111; 4 pages.
Letter from Yuasa and Hara; dated Oct. 21, 2013; for Japanese Pat. App. No. 2010-534111; 1 page.
PCT Partial Search Report and Invitation to Pay Additional Fees dated Jun. 16, 2008 for PCT/US2008/050026.
PCT Search Report and Written Opinion of the ISA for PCT/US2008/050026 dated Aug. 29, 2008.
PCT Search Report and Written Opinion for the ISA of PCT/US2008/082934 mailed Dec. 15, 2009.
PCT International Preliminary Report on Patentability of the ISA dated May 27, 2010 for PCT/US2008/082934, pp. 1-14.
PCT Search Report and Written Opinion of the ISA for PCT/US2011/062500 dated Apr. 3, 2012.
Image File Wrapper downloaded on Dec. 14, 2009 for U.S. Appl. No. 11/619,675, filed Jan. 4, 2007 Part 1 of 2; pp. 1-305.
Image File Wrapper downloaded on Dec. 14, 2009 for U.S. Appl. No. 11/619,675, filed Jan. 4, 2007 Part 1 of 2; pp. 1-313.
Image File Wrapper downloaded on Nov. 29, 2009 for U.S. Pat. No. 7,675,245, Timeframe Dec. 14, 2009-Nov. 29, 2010; 198 pages.
Image File Wrapper downloaded on Apr. 25, 2013 for U.S. Pat. No. 8,274,238; Part 1 of 6; 350 pages.
Image File Wrapper downloaded on Apr. 25, 2013; for U.S. Pat. No. 8,274,238; Part 2 of 6; 350 pages.
Image File Wrapper downloaded on Apr. 25, 2013; for U.S. Pat. No. 8,274,238; Part 3 of 6; 350 pages.
Image File Wrapper downloaded on Apr. 25, 2013; for U.S. Pat. No. 8,274,238; Part 4 of 6; 350 pages.
Image File Wrapper; downloaded Apr. 25, 2013; for U.S. Pat. No. 8,274,238; Part 5 of 6; 350 pages.
Image File Wrapper; downloaded Apr. 25, 2013; for U.S. Pat. No. 8,274,238; Part 6 of 6; 350 pages.
Response to Restriction Requirement filed Aug. 15, 2014; to Restriction Requirement dated Jun. 20, 2014; for U.S. Appl. No. 13/177,075; 2 pages.
Second Prelminary Amendment filed Aug. 15, 2014; for U.S. Appl. No. 13/177,075; 10 pages.
Letter from Yuasa and Hara dated Jul. 22, 2014; for Japanese Pat. App. No. 2013-105879; 2 pages.
Japanese Office Action dated Jun. 4, 2014; for Japanese Pat. App. No. 2013-105879; 2 pages.
Japanese Office Action (English Translation) dated Jun. 4, 2014; for Japanese Pat. App. No. 2013-105879; 2 pages.
Response filed Oct. 27, 2014; to Office Action bated Jun. 20, 2014; for U.S. Appl. No. 13/177,070; 23 pages.
Office Action dated Oct. 30, 2014; for U.S. Appl. No. 13/177,075; 24 pages.
Taiwan Office Action and Search Report, with English translation; dated Oct. 2, 2014; for Taiwan Pat. App. No. 101123288; 19 pages.
U.S. Appl. No. 13/591,564, filed Aug. 22, 2012, Raval et al.
U.S. Appl. No. 13/752,904, filed Jan. 29, 2013, Raval et al.
Allegro Microsystems, Inc., Data Sheet A8500; "Flexible WLED/RGB Backlight Driver for Medium Size LCDs;" Jan. 2006-2010; pp. 1-16.
Allegro Microsystems, Inc., Data Sheet A8501; "2 MHz, 4 Channel X 100 mA WLED/RGB Driver with Output Disconnect;" Jan. 2008-2010; pp. 1-24.
Allegro Microsystems, Inc., Data Sheet A8502; "Wide Input Voltage Range, High Efficiency Fault Tolerant LED Driver;" Jan. 16, 2012; pp. 1-35.
Allegro Microsystems, Inc., Data Sheet A8503; "High Efficiency 6-Channel, 2 MHz, WLED/RGB Driver for Medium Displays, with Integrated 55 V Power Switch;" Jan. 2009; pp. 1-17.
Allegro Microsystems, Inc., Data Sheet A8504, "WLED/RGB Backlight Driver for Medium Size LEDs;" Jan. 2007-2009; pp. 1-18.
Allegro Microsystems, Inc., Date Sheet A8508; "Wide Input Voltage Range, high Efficiency 8-Channel Fault Tolerant LED Driver;" Jul. 9, 2012; pp. 1-28.
MAXIM Datasheet; MAX16807/MAX16808, "Integrated 8-Channel LED Drivers with Switch Mode Boost and SEPIC Controller", #19-0655, Oct. 2006, pp. 1-21.
"White LED Driver IC;" NPC Nippon Precision Circuits, Inc.; SM8132A; May 2005; pp. 1-18.
Witt; Linear Technology; Design Notes; "Short-Circuit Protection for Boost Regulators;" Jan. 1997, 2 pages.
"WLED Backlight Driviers with True Shutdown and OVP;" A8432 and A8433; Allegro MicroSystems, Inc. Concept Data Sheet; Jan. 25, 2005; 6 pages.
PCT Search Report and Written Opinion of the ISA for PCT/US2012/043275 dated Sep. 4, 2012.
PCT Search Report and Written Opinion of the ISA dated Oct. 1, 2012; for PCT Pat. App. No. PCT/US2012/044149, 11 pages, 11 pages.
Image File Wrapper downloaded on Dec. 14, 2009 for U.S. Appl. No. 11/619,675, filed Jan. 4, 2007 Part 2 of 2; pp. 1-313.
Image File Wrapper downloaded on Nov. 29, 2010 for U.S. Pat. No. 7,875.245, Timeframe Dec. 14, 2009-Nov. 29, 2010; 198 pages.
Image File Wrapper downloaded on Aug. 28, 2012 for U.S. Pat. No. 7,999,487 issued on Aug. 16, 2011 Part 1 of 5; 400 pages.
Image File Wrapper downloaded on Aug. 28, 2012 for U.S. Pat. No. 7,999,487 issued on Aug. 16, 2011 Part 2 of 5: 400 pages.
Image File Wrapper downloaded on Aug. 28, 2012 for U.S. Pat. No. 7,999,487 issued on Aug. 16, 2011 Part 3 of 5; 400 pages.
Image File Wrapper downloaded on Aug. 28, 2012 for U.S. Pat. No. 7,999,487 issued on Aug. 16, 2011 Part 4 of 5, 400 pages.
Image File Wrapper downloaded on Aug. 28, 2012 for U.S. Pat. No. 7,999,487 issued on Aug. 16, 2011 Part 5 of 5; 50 pages.

(56) References Cited

OTHER PUBLICATIONS

Image File Wrapper downloaded on Aug. 28, 2012 for U.S. Pat. No. 8,169,161 issued on May 11, 2012 Part 1 of 5; 400 pages.
Image File Wrapper downloaded on Aug. 28, 2012 for U.S. Pat. No. 8,169,161 issued on May 11, 2012 Part 2 of 5: 400 pages.
Image File Wrapper downloaded on Aug. 28, 2012 for U.S. Pat. No. 8,169,161 issued on May 11, 2012 Part 3 of 5; 400 pages.
Image File Wrapper downloaded on Aug. 28, 2012 for U.S. Pat. No. 8,169,161 issued on May 11, 2012 Part 4 of 5; 400 pages.
image File Wrapper downloaded on Aug. 28, 2012 for U.S. Pat. No. 8,169,161 issued on May 11, 2012 Part 5 of 5; 176 pages.
Letter from Yuasa and Hara dated Mar. 14, 2014; for Japanese Pat. App. No. 2010-534111; 1 page.
Japanese Notice of Allowance received Mar. 14, 2014; Japanese Pat. App. No. 2010-534111; 3 pages.
Office Action dated Jun. 20, 2014 for U.S. Appl. No. 13/177,070, filed Jul. 6, 2011.
Restriction Requirement dated Jun. 20, 2014 for U.S. Appl. No. 13/177,075, filed Jul. 6, 2011.
Office Action dated May 28, 2014 for U.S. Appl. No. 13/691,570, filed Aug. 22, 2012.
PCT International Preliminary Report on Patentability and Written Opinion of the ISA dated Jan. 16, 2014; for PCT Pat. App. No. PCT/US2012/043275; 6 pages.
PCT International Preliminary Report on Patentability and Written Opinion dated Jan. 16, 2014; for PCT Pat. App. No. PCT/US2012/044149; 7 pages.
Response to May 28, 2014 Office Action as filed on Aug. 7, 2014 for U.S. Appl. No. 13/591,570, filed Aug. 22, 2012.
Notice of Allowance dated Oct. 9, 2014 for U.S. Appl. No. 13/591,570, filed Aug. 22, 2012.
Korean Notice to Submit a Response dated Nov. 19, 2014; for Korean Pat. App. No. 10-2010-7009105; 3 pages.
Notice of Allowance dated Jan. 15, 2015; for U.S. Appl. No. 13/177,070; 20 pages.
Letter to Yuasa and Hara (including suggested claims) dated Sep. 23, 2014; for Japanese Pat. App. No. 2013-105879; 6 pages.
Japanese Claims as filed on Oct. 3, 2014; for Japanese Pat. App. No. 2013-105879; 4 pages.
312 Amendment filed Jan. 23, 2015; for U.S. Appl. No. 13/177,070; 17 pages.
Japanese Notice of Reasons for Rejection (English translation) dated Jan. 26, 2015; for Japanese Pat. App. No. 2014-078475 4 pages.
Response filed Mar. 3, 2015; to Office Action dated Oct. 30, 2014; for U.S. Appl. No. 13/177,075; 16 pages.

ELECTRONIC CIRCUITS FOR DRIVING SERIES CONNECTED LIGHT EMITTING DIODE STRINGS

CROSS REFERENCE TO RELATED APPLICATIONS

This application is a Divisional Application of and claims the benefit of U.S. patent application Ser. No. 13/428,654, filed on Mar. 23, 2012 and issued on Feb. 18, 2014 as U.S. Pat. No. 8,653,756, which application is a Divisional Application of and claims the benefit of U.S. patent application Ser. No. 12/267,645, filed on Nov. 10, 2008 and issued on May 1, 2012 as U.S. Pat. No. 8,169,161, which application claims the benefit under 35 U.S.C. §119(e) of U.S. Provisional Application No. 60/988,520, filed on Nov. 16, 2007, which applications and patents are incorporated herein by reference in their entirety.

STATEMENT REGARDING FEDERALLY SPONSORED RESEARCH

Not Applicable.

FIELD OF THE INVENTION

This invention relates generally to electronic circuits and, more particularly, to electronic circuits used to drive a diode load, for example, a light emitting diode (LED) load.

BACKGROUND OF THE INVENTION

A variety of electronic circuits are used to drive diode loads and, more particularly, to control electrical current through strings of series connected light-emitting diodes (LEDs), which, in some embodiments, form an LED display, or, more particularly, a backlight for a display, for example, a liquid crystal display (LCD). It is known that individual LEDs have a variation in forward voltage drop from unit to unit. Therefore, the strings of series connected LEDs can have a variation in forward voltage drop.

Strings of series connected LEDs can be coupled to a common switching regulator, e.g., a boost switching regulator, at one end of the LED strings, the switching regulator configured to provide a high enough voltage to supply each of the strings of LEDs. The other end of each of the strings of series connected LEDs can be coupled to a respective current sink, configured to sink a relatively constant current through each of the strings of series connected LEDs.

It will be appreciated that the voltage generated by the common switching regulator must be a high enough voltage to supply the one series connected string of LEDs having the greatest total voltage drop, plus an overhead voltage needed by the respective current sink. In other words, if four series connected strings of LEDs have voltage drops of 30V, 30V, 30V, and 31 volts, and each respective current sink requires at least one volt in order to operate, then the common boost switching regulator must supply at least 32 volts.

While it is possible to provide a fixed voltage switching regulator that can supply enough voltage for all possible series strings of LEDs, such a switching regulator would generate unnecessarily high power dissipation when driving strings of series connected LEDs having less voltage drop. Therefore, in some LED driver circuits, the voltage drops through each of the strings of series connected LEDs are sensed (for example, by a so-called "minimum select circuit") to select a lowest voltage appearing at the end of one of the strings of series connected LEDs and the common switching regulator is controlled to generate an output voltage only high enough to drive the series connected LED string having the lowest voltage (i.e., the highest voltage drop). One such minimum select circuit is described, for example, in U.S. Pat. No. 6,822,403.

SUMMARY OF THE INVENTION

In accordance with one aspect of the present invention, an electronic circuit for driving a plurality of series connected light emitting diode strings with a controllable DC-DC converter includes a plurality of current regulators, each having a respective input node and a respective output node, the input node or the output node coupled to an end of a respective one of the plurality of series connected light emitting diode strings. Each current regulator is configured to pass a respective predetermined current through the respective one of the plurality of series connected light emitting diode strings to which it is coupled. The electronic circuit also includes a multi-input error amplifier having a plurality of input nodes and an output node. Each one of the plurality of input nodes is coupled to the input node or the output node of a respective one of the plurality of current regulators. The multi-input error amplifier is configured to generate an error signal at the output node of the error amplifier.

In accordance with another aspect of the present invention, an electronic circuit for driving a plurality of series connected light emitting diode strings with a controllable DC-DC converter includes a plurality of current regulators, each having a respective input node and a respective output node, the input node or the output node coupled to an end of a respective one of the plurality of series connected light emitting diode strings. Each current regulator is configured to pass a respective predetermined current through the respective one of the plurality of series connected light emitting diode strings to which it is coupled. The electronic circuit also includes a plurality of error amplifiers, each having a respective input node and a respective output node. Each one of the plurality of input nodes of the plurality of error amplifiers is coupled to the input node or the output node of a respective one of the plurality of current regulators. The output nodes of the plurality of error amplifiers are coupled to a junction node. The plurality of error amplifiers is configured to generate an error signal at the junction node.

In accordance with another aspect of the present invention, an electronic circuit for driving a plurality of series connected light emitting diode strings with a controllable DC-DC converter includes a plurality of current regulators, each having a respective input node and a respective output node, the input node or the output node coupled to an end of a respective one of the plurality of series connected light emitting diode strings. Each current regulator is configured to pass a respective predetermined current through the respective one of the plurality of series connected light emitting diode strings to which it is coupled. The electronic circuit also includes a plurality of switches, each having a respective input node, a respective output node, and a respective control node. Each one of the input nodes of the plurality of switches is coupled to the input node or the output node of a respective one of the plurality of current regulators. The output nodes of the plurality of switches are coupled together resulting is a composite signal. The electronic circuit also includes a digital channel select circuit coupled to the control nodes of the plurality of switches and configured to close each one of the plurality of switches sequentially and periodically. The electronic circuit also includes an error amplifier having an input node and an output node. The input node of the error amplifier is coupled to receive the composite signal. The error amplifier is configured to generate an error signal at the output node of the error amplifier.

In accordance with another aspect of the present invention, an electronic circuit for driving a plurality of series connected light emitting diode strings with a controllable DC-DC converter includes a plurality of field effect transistors (FETs), each FET having a respective drain, source, and gate. Each FET is configured to pass a predetermined current from the respective drain to the respective source. The electronic circuit also includes a plurality of resistors, each having respective first and second ends, each resistor coupled at the first end to a respective source of one of the plurality of FETs, forming a respective current sense node. The drain of each FET or the second end of each resistor is coupled to an end of a respective one of the plurality of series connected light emitting diode strings. The electronic circuit also includes a plurality of amplifiers, each amplifier having a respective input node coupled to a respective current sense node, and each amplifier having a respective output node coupled to a respective gate of a respective FET. Each one of the plurality of amplifiers is configured to generate a respective control voltage signal at the respective output node indicative of a control of the respective FET for the respective FET to pass the predetermined current from the respective drain to the respective source. The electronic circuit also includes a maximum select circuit having a plurality of input nodes coupled to receive the control voltage signals from the plurality of amplifiers and having an output node. The maximum select circuit is configured to select a largest one of the control voltage signals and to generate a signal representative of the largest one of the control voltage signals at the output node. The electronic circuit also includes an error amplifier having an input node and an output node. The input node of the error amplifier is coupled to the output node of the maximum select circuit. The error amplifier is configured to generate an error signal at the output node of the error amplifier.

In accordance with another aspect of the present invention, an electronic circuit for driving a plurality of series connected light emitting diode strings with a controllable DC-DC converter includes a plurality of current regulators, each having a respective input node and a respective output node, the input node or the output node coupled to an end of a respective one of the plurality of series connected light emitting diode strings. Each current regulator is configured to pass a respective predetermined current through the respective one of the plurality of series connected light emitting diode strings to which it is coupled. The electronic circuit also includes a plurality of switches, each having a respective input node, a respective output node, and a respective control node. Each one of the input nodes of the plurality of switches is coupled to the input node or the output node of a respective one of the plurality of current regulators. The output nodes of the plurality of switches are coupled together resulting is a composite signal. The electronic circuit also includes a comparator coupled to receive the composite signal and configured to generate a comparison signal. The electronic circuit also includes a digital channel select circuit coupled to receive the comparison signal and coupled to the control nodes of the plurality of switches and configured to close each one of the plurality of switches sequentially for a time period responsive to the comparison signal. The electronic circuit also includes an error amplifier having an input node and an output node. The input node of the error amplifier is coupled to receive the composite signal. The error amplifier is configured to generate an error signal at the output node of the error amplifier.

In accordance with another aspect of the present invention, a method of driving a plurality of series connected light emitting diode strings with a controllable DC-DC converter includes attempting to pass a respective predetermined current through each one of the plurality of series connected light emitting diode strings, resulting in a respective voltage appearing at an end of each one of the plurality of series connected light emitting diode strings. The method also includes summing each one of the voltages to generate an error signal to control the DC-DC converter.

In accordance with another aspect of the present invention, a method of driving a plurality of series connected light emitting diode strings with a controllable DC-DC converter includes attempting to pass a respective predetermined current through each one of the plurality of series connected light emitting diode strings, resulting in a respective voltage appearing at an end of each one of the plurality of series connected light emitting diode strings. The method also includes generating respective intermediate signals representative each one of the voltages, and summing the intermediate signals to generate an error signal to control the DC-DC converter.

In accordance with another aspect of the present invention, a method of driving a plurality of series connected light emitting diode strings with a controllable DC-DC converter includes attempting to pass a respective predetermined current through each one of the plurality of series connected light emitting diode strings, resulting in a respective voltage appearing at an end of each one of the plurality of series connected light emitting diode strings. The method also includes sampling each one of the voltages sequentially and periodically to generate voltage samples, and summing the voltage samples to generate an error signal to control the DC-DC converter.

In accordance with another aspect of the present invention, a method of driving a plurality of series connected light emitting diode strings with a controllable DC-DC converter includes attempting to pass a respective predetermined current through each one of the plurality of series connected light emitting diode strings with a respective feedback current control circuit, resulting in a respective voltage appearing at an end of each one of the plurality of series connected light emitting diode strings. A control node of the feedback circuit generates a control voltage that changes in a direction opposite to a change of the respective voltage. The method also includes detecting a largest one of the control voltages, and generating an error signal representative of the largest one of the control voltages to control the DC-DC converter.

In accordance with another aspect of the present invention, a method of driving a plurality of series connected light emitting diode strings with a controllable DC-DC converter includes attempting to pass a respective predetermined current through each one of the plurality of series connected light emitting diode strings, resulting in a respective voltage appearing at an end of each one of the plurality of series connected light emitting diode strings. The method also includes sampling each one of the voltages sequentially to generate voltage samples, and comparing each one of the voltage samples to a threshold signal to generate a comparison signal. Each one of the voltage samples has a time period responsive to the comparison signal. The method also includes summing the voltage samples to generate an error signal to control the DC-DC converter.

The above-described circuits and method provide a controllable DC-DC converter to drive a plurality of series connected light emitting diode strings. The controllable DC-DC converter is controlled in such a way as to provide just enough voltage so as to minimize the power dissipation in the a plurality of series connected light emitting diode strings while not being overly affected if one of the a plurality of series connected light emitting diode strings becomes open circuited.

BRIEF DESCRIPTION OF THE DRAWINGS

The foregoing features of the invention, as well as the invention itself may be more fully understood from the following detailed description of the drawings, in which.

DETAILED DESCRIPTION OF THE INVENTION

Before describing the present invention, some introductory concepts and terminology are explained. As used herein, the term "boost switching regulator" is used to describe a known type of switching regulator that provides an output voltage higher than an input voltage to the boost switching regulator. While a certain particular circuit topology of boost switching regulator is shown herein, it should be understood that boost switching regulators have a variety of circuit configurations. As used herein, the term "buck switching regulator" is used to describe a known type of switching regulator that provides an output voltage lower than an input voltage to the buck switching regulator. It should be understood that there are still other forms of switching regulators other than a boost switching regulator and other than a buck switching regulator, and this invention is not limited to any one type.

DC-DC converters are described herein. The described DC-DC converters can be any form of switching regulator, including, but not limited to, the above-described boost and buck switching regulators.

As used herein, the term "current regulator" is used to describe a circuit or a circuit component that can regulate a current passing through the circuit or circuit component to a predetermined, i.e., regulated, current. A current regulator can be a "current sink," which can input a regulated current, or a "current source," which can output a regulated current. A current regulator has a "current node" at which a current is output in the case of a current source, or at which a current is input in the case of a current sink.

As used herein, the term "current sense circuit" is used to describe a circuit that can sense a regulated current passing through a circuit. In some particular arrangements, the current sense circuit provides a voltage output proportional to a sensed current.

Figure 1:
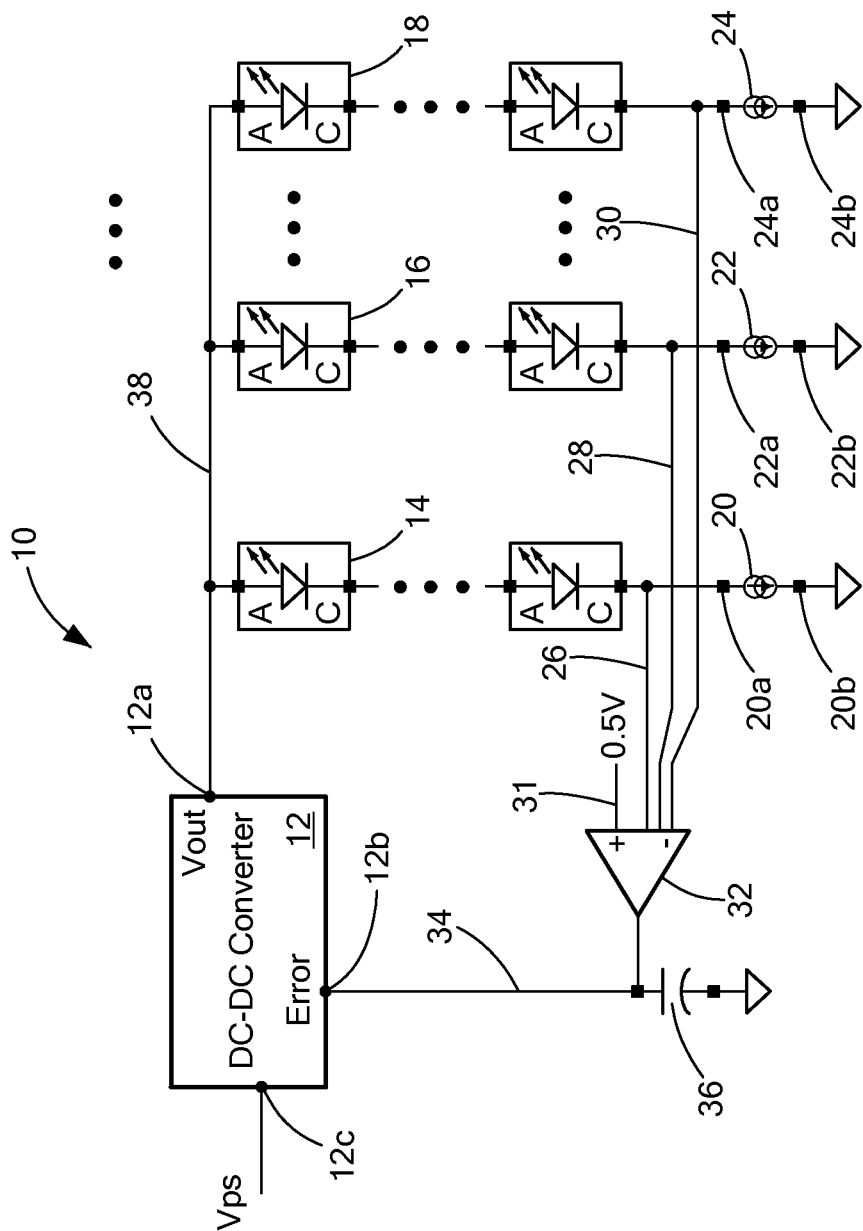
FIG. 1 is a schematic diagram of an electronic circuit for driving a diode load, the electronic circuit having a controllable DC-DC converter, current regulators, and a multiple-input error amplifier configured to provide an error signal to control an output voltage generated by the controllable DC-DC converter.

Referring to FIG. 1, an exemplary electronic circuit 10 includes a controllable DC-DC converter 12 coupled to series connected diode strings 14, 16, 18, which, in some arrangements, are series connected light emitting diode (LED) strings as may form an LED display or a backlight for a display, for example, a liquid crystal display (LCD). As described above, in some arrangements, the controllable DC-DC converter 12 is a switching regulator, one type of which is described more fully below in conjunction with FIG. 2. The series connected LED strings 14-18 are coupled to respective current regulators 20, 22, 24, here shown to be current sinks. Each one of the current regulators 20, 22, 24 has a respective voltage sense node 20a-24a.

Since the series connected LED strings 14-18 can each generate a different voltage drop, the voltages appearing at the voltage sense nodes 20a-24a can be different. It will also be recognized that at least a predetermined minimum voltage must be present at each of the voltage sense nodes in order for the current regulators 20, 22, 24 to function properly, i.e., to sink the desired current for which they are designed.

A multi-input error amplifier 32 is coupled to receive voltage signals 26, 28, 30 corresponding to voltages appearing at the voltage sense nodes 20a-24a, respectively, at an inverting input node. The multi-input error amplifier 32 is also coupled to receive a reference voltage signal 31, for example, 0.5 volts, at a non-inverting input node. The multi-input error amplifier 32 is configured to generate an error signal 34, which is related to an opposite of an arithmetic mean of the voltage signals 26-30. In some particular arrangements, the multi-input error amplifier 32 has inputs comprised of metal oxide semiconductor (MOS) transistors, as shown below in FIG. 3. In some arrangements, the error amplifier 32 is a transconductance amplifier, which provides a current-type output.

The circuit 10 can include a capacitor 36. The capacitor 36 can be comprised of an output capacitance of the multi-input error amplifier 32 in parallel with an input capacitance of an error node 12b of the controllable DC-DC converter 12. However, in some other arrangements, the capacitor 36 can include another capacitor as well. In one particular arrangement, the capacitor 36 has a value of about one hundred picofarads. The capacitor 36 can provide a loop filter and can have a value selected to stabilize a feedback control loop.

The controllable DC-DC converter 12 is coupled to receive the error signal 34 at the error node 12b of the controllable DC-DC converter 12. The controllable DC-DC converter 12 is also coupled to receive a power supply voltage, Vps, at an input node 12c and to generate a regulated output voltage 38 at an output node 12a in response to the error signal 34. In some arrangements, the controllable DC-DC converter 12 is a boost switching regulator and the controllable DC-DC converter 12 is coupled to receive the power supply voltage, Vps, at the input node 12c and to generate a relatively higher regulated output voltage 38 at the output node 12a.

With this arrangement, the controllable DC-DC converter 12 is controlled by an arithmetic mean of the voltage signals 26, 28, 30. Thus, a voltage signal 26, 28, 30 that would be too low to provide proper operation of an associated one of the current regulators 20, 22, 24 will result in an increase in the error signal 34, tending to raise the output voltage 38 of the controllable DC-DC converter 12.

It should be appreciated that the regulated output voltage 38 has a particular desired value. Specifically, the particular desired value of the regulated output voltage 38 is that which achieves a high enough voltage at all of the current regulators 20, 22, 24 so that they can all operate properly to regulate current as desired. In addition, the particular desired value of the regulated output voltage 38 is that which is as low as possible so that the one or more of the current regulators that receive the lowest voltage(s) (i.e., the greatest voltage drop across the associated series connected LED strings 14, 16, 18) have just enough voltage to properly operate. With this particular desired value of the regulated output voltage 38, a low power is expended in the current regulators 22, 24, 26, resulting in high power efficiency while properly illuminating the LEDs.

In some particular arrangements, the desired value of regulated voltage 38 can include a voltage margin (e.g., one volt). In other words, in some arrangements, the particular desired value of the regulated output voltage 38 is that which is as low as possible so that the one or more of the current regulators that receive the lowest voltage(s) have just enough voltage to properly operate, plus the voltage margin. Still, a low power consumption results.

The above described error signal 34, which is the arithmetic mean of the voltage signals 26, 28, 30, approximately achieves the particular desired value of the regulated output voltage 38.

Certain elements of the circuit 10 can be within a single integrated circuit. For example, in some arrangements, the current regulators 20, 22, 24, the multi-input amplifier 32, the capacitor 36, and some internal elements of the controllable DC-DC converter 12 (described more fully below in conjunction with FIG. 2) can be within the single integrated circuit.

In some alternate arrangements, the multi-input error amplifier 32 is replaced by a multi-input comparator, which either has hysteresis, or which is periodically clocked at which time it makes a comparison.

In some alternate embodiments, the current regulators 20-24, which are shown to be coupled to the bottom (cathode) ends of the series connected LED strings 14-18, respectively, can instead be at to top (anode) ends of the series connected LED strings 14-18, respectively. In these embodiments, the input nodes 20a-24a are coupled to receive the regulated output voltage 38, and output nodes 20b-24b are coupled to the anode ends of the series connected LED strings 14-18, respectively. Furthermore, in these embodiments, the inverting inputs of the error amplifier 32 are coupled to the output nodes 20b-24b, which become the voltage sense nodes in place of the input nodes 20a-24a, and the non-inverting input of the error amplifier 32 is coupled to receive a different reference voltage.

The circuit 10 has advantages over the prior art. For example, the circuit 10 avoids the necessity for the above-described minimum select circuit, which can result in less integrated circuit die area.

Figure 2:
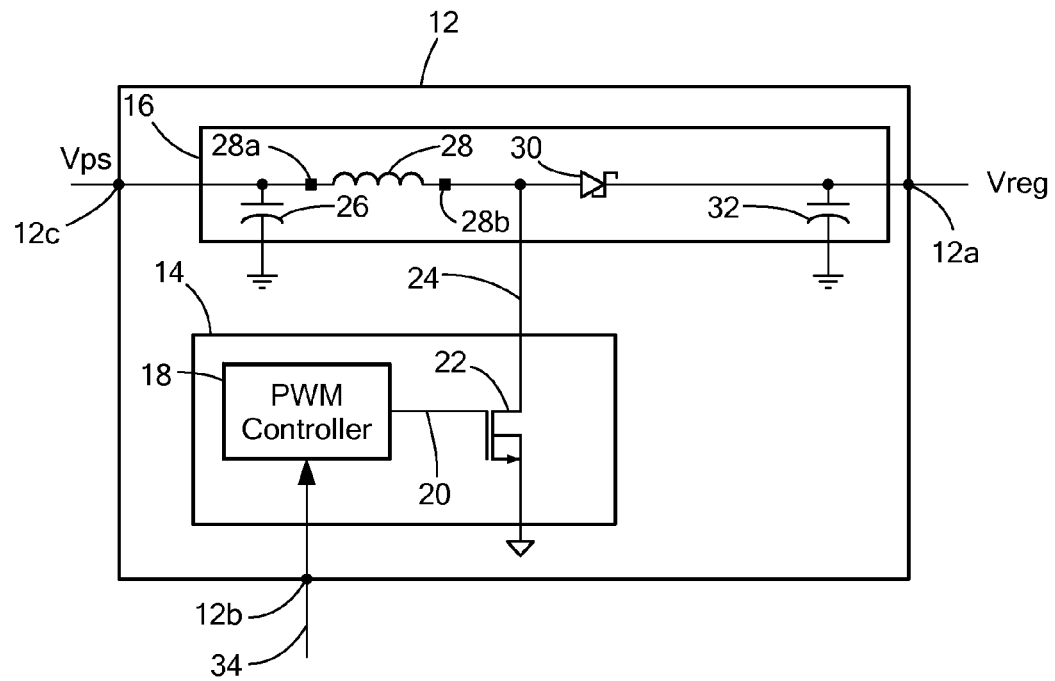
FIG. 2 is a schematic diagram of a switching regulator circuit that can be used as the controllable DC-DC converter of FIG. 1.

Referring now to FIG. 2, in which like elements of FIG. 1 are shown having like reference designations, the controllable DC-DC converter 12 can include a portion 14 that can be within the above-described integrated circuit, and a portion 16 that can be external to but coupled to the integrated circuit.

The portion 14 can include a pulse width modulation (PWM) controller 18 coupled to receive the error signal 34 from the multiple-input error amplifier 32 of FIG. 1. The PWM controller 18 is configured to generate a PWM signal 20. A control current passing element, for example, a FET 22, is coupled to receive the PWM signal 20 at a gate node and to receive a pulsed current signal 24 at a drain node.

The portion 16 can include an input capacitor 26 coupled between the power supply voltage, Vps, received at the node 12c and a ground voltage. An inductor 28 can have an input node 28a also coupled to receive the input voltage, Vps, and an output node 28b coupled to the drain node of the FET 22. A diode 30 can have an anode coupled to the output node 28b of the inductor 28 and a cathode coupled to the output node 12a, at which the regulated output voltage, Vreg, is generated. An output capacitor 32 can be coupled between the output node 12a and the ground voltage.

Figure 3:
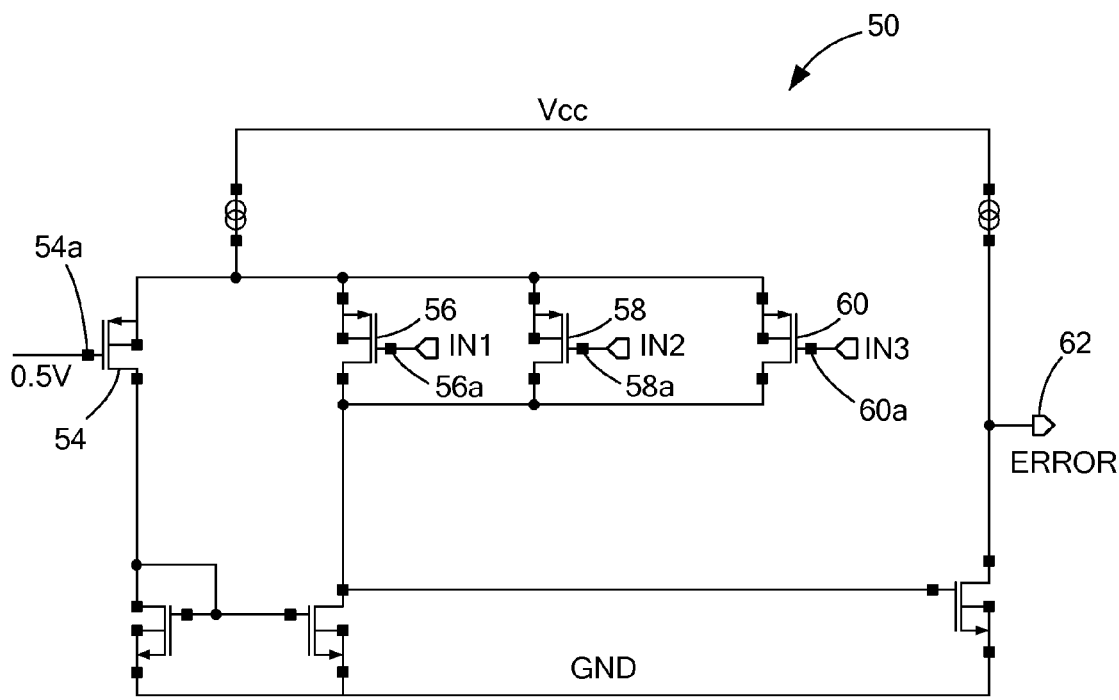
FIG. 3 is a schematic diagram of an exemplary amplifier that can be used as the multiple-input error amplifier of FIG. 1.

Referring now to FIG. 3, a multi-input error amplifier 50 can be the same as or similar to the multi-input error amplifier 32 of FIG. 1. The multi-input error amplifier 50 can include a non-inverting node 54a associated with a metal oxide semiconductor (MOS) field effect transistor (FET). The multi-input error amplifier 50 can also include a plurality of inverting input nodes, here shown as three inverting input nodes 56a, 58a, 60a, associated with MOSFETs 56, 58, 60, respectively. One of ordinary skill in the art will understand that, with this particular arrangement, the gain of the multi-input error amplifier 50 will be proportional to the number of inverting inputs that are used. Therefore, as described above, the gain of the multi-input error amplifier 50 is proportional to an arithmetic mean of signals applied to the three inverting input ports 56a, 58a, 60a.

Figure 4:
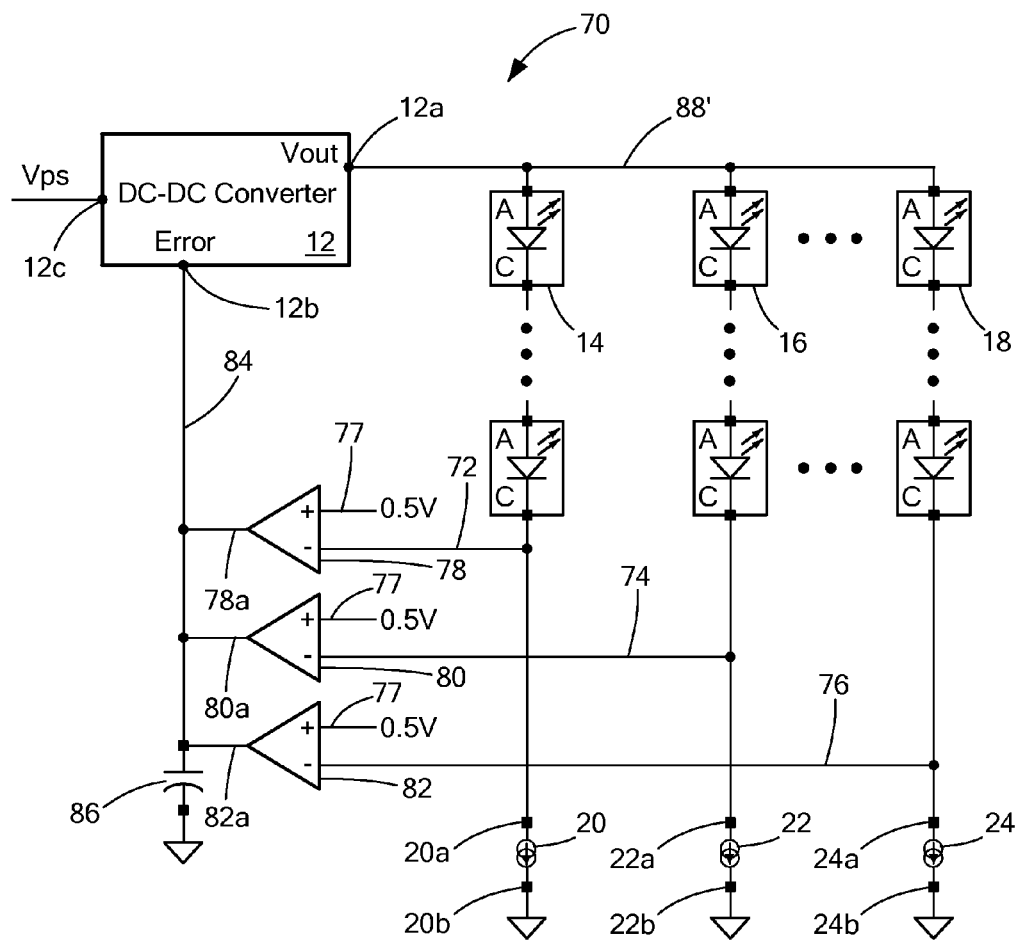
FIG. 4 is a schematic diagram of another electronic circuit for driving a diode load, the electronic circuit having a controllable DC-DC converter, current regulators, and a plurality of error amplifiers configured to provide an error signal to control an output voltage generated by the controllable DC-DC converter.

Referring now to FIG. 4, in which like elements of FIG. 1 are shown having like reference designations, an exemplary electronic circuit 70 includes error amplifiers 78, 80, 82. The error amplifier 78 is coupled to receive a voltage signal 72 at an inverting input node and configured to generate an error signal 78a, the error amplifier 80 is coupled to receive a voltage signal 74 at an inverting input node and configured to generate an error signal 80a, and the error amplifier 82 is coupled to receive a voltage signal 76 at an inverting input node and configured to generate an error signal 82a. The voltage signals 72, 74, 76 can be the same as or similar to the voltage signals 26, 28, 30, respectively, of FIG. 1. The error amplifiers 78, 80, 82 are also coupled to receive a reference voltage 77, for example, 0.5 volts, at their non-inverting input nodes. The error signals 78a, 80a, 82a sum to generate an error signal 84 in a particular way described more fully below. In some arrangements, the error amplifiers 78, 80, 82 are transconductance amplifiers, which provide current-type outputs.

The circuit 70 can include a capacitor 86 coupled to the output nodes of the error amplifiers 78, 80, 82. The capacitor 86 can be comprised of a parallel combination of output capacitances of the error amplifiers 78, 80, 82 in parallel with the input capacitance of the error node 12b of the controllable DC-DC converter 12. However, in some other arrangements, the capacitor 86 can include another capacitor as well. In one particular arrangement, the capacitor 86 has a value of about one hundred picofarads. The capacitor 86 can provide a loop filter and can have a value selected to stabilize a feedback control loop.

In one particular arrangement, the error signals 78a, 80a, 82a sum in a particular way to generate the error signal 84. In particular, the output stages (not shown) of the amplifiers 78, 80, 82 can be configured to provide a larger current in one direction than in the other direction. In other words, the output stages of the amplifiers 78, 80, 82 can source more current than they can sink, or vice versa. With this arrangement, for example, if the amplifiers 78, 80, 82 can source more current than they can sink, and if the error signal 84 is lower in voltage than one of the amplifiers 78, 80, 82 attempts to generate, the amplifier attempting to drive the voltage of the error signal 84 higher can at least partially override other ones of the amplifiers 78, 80, 82, which are attempting drive the voltage of the error signal 84 lower. For this particular example, since the amplifiers 78, 80, 82 are inverting amplifiers, the amplifier attempting to drive the error signal 84 higher is associated with a current regulator 20, 22, 24, which has a voltage sense node 20a, 22a, 24a, at which a lowest voltage occurs.

One of ordinary skill in the art will recognize that an amplifier with asymmetrical output current drive ability is fashioned by way of asymmetrically sized output transistors in an output stage of the amplifier.

The controllable DC-DC converter 12 is coupled to receive the error signal 84 at the error node 12b of the controllable DC-DC converter 12. The controllable DC-DC converter 12 is also coupled to receive the power supply voltage, Vps, at the input node 12c and to generate a regulated output voltage 88 at the output node 12a in response to the error signal 84. It should be recognized that the regulated output voltage 88 can be the same as or similar to the regulated output voltage 38 of FIG. 1. However, since the error signal 84 is generated in a different way than the error signal 34 of FIG. 1, the regulated output voltage 88 need not be exactly the same as the regulated output voltage 38.

With this arrangement, the controllable DC-DC converter 12 is controlled predominantly by one or more of the amplifiers 78, 80, 82, which is coupled to one or more of the current regulators 20, 22, 24 having the lowest voltage. However, other ones of the amplifiers 78, 80, 82 also contribute to the error signal 84, but with less influence. Thus, a voltage signal 72, 74, 76 that would otherwise be too low to provide proper operation of an associated one of the current regulators 20, 22, 24 will result in an increase in the error signal 84, tending to raise the regulated output voltage 88 of the controllable DC-DC converter 12.

A particular desired value of the regulated output voltage 38 is described above in conjunction with FIG. 1, and the same particular desired value applies in the same way to the regulated output voltage 88. The above described error signal 84, which is dominated by one or more of the signals 78a, 80a, 82a, which are representative of a respective lowest one or more of the voltage signals 72, 74, 76, approximately achieves the particular desired value of the regulated output voltage 88.

Certain elements of the circuit 70 can be within a single integrated circuit. For example, in some arrangements, the current regulators 20, 22, 24, the amplifiers 78, 80, 82, the capacitor 86, and some internal elements of the controllable DC-DC converter 12 (described more fully above in conjunction with FIG. 2) can be within the single integrated circuit.

In some alternate arrangements, the error amplifiers 78, 80, 82 can be replaced by comparators, for which the outputs can be combined with an OR gate.

In some alternate embodiments, the current regulators 20-24, which are shown to be coupled to the bottom (cathode) ends of the series connected LED strings 14-18, respectively, can instead be at to top (anode) ends of the series connected LED strings 14-18, respectively. In these embodiments, the input nodes 20a-24a are coupled to receive the regulated output voltage 38, and output nodes 20b-24b are coupled to the anode ends of the series connected LED strings 14-18, respectively. Furthermore, in these embodiments, the inverting inputs of the error amplifiers 78-82 are coupled to the output nodes 20b-24b, which become the voltage sense nodes in place of the input nodes 20a-24a, and the non-inverting inputs of the error amplifiers 78-82 are coupled to receive a different reference voltage.

The circuit 70 has advantages over the prior art. For example, the circuit 70 avoids the necessity for the above-described minimum select circuit, which can result in less integrated circuit die area. Furthermore, for embodiments in which the error amplifiers 78, 80, 82 have asymmetrical output drive capabilities as described above, a loop gain of the circuit 70 tends to change (e.g., drop) as more of the current regulators 20, 22, 24 come into regulation, i.e., receive sufficiently high voltage signals 72, 74, 76. The lower gain of the loop results in a drop of the error signal 84 as soon as any of the current regulators 20, 22, 24 begin to regulate. For embodiments in which the controllable DC-DC converter 12 is a boost switching regulator (described more fully below in conjunction with FIG. 2), this tends to improve feedback loop stability and reduce overshoot and ringing that might occur during any voltage step, for example, at turn on of the circuit 70.

As yet another advantage, for some arrangements similar to the circuit 70, one or more of the series connected LED string 14, 16, 18 can receive a different regulated voltage, for example, from a different respective one of more DC-DC converters (not shown). This arrangement is advantageous for circuits that require that a respective one or more of the current regulator 20, 22, 24 regulate to a different current. For example, if the two current regulators 20, 22 and associated two series connected LED strings 14, 16 were passing twenty milliamps and the one current regulator 24 and associated series connected LED string 18 were passing one hundred milliamps, then the series connected LED string 18 would require a higher regulated voltage than the regulated voltage 88. Examples where different currents are required include RGB (red-green-blue) applications where each series connected LED string has different colored LEDs or provides a backlight for different colored LEDs. Another example is a circuit for flash applications where some series connected LED strings would be for backlighting and other series connected LED string would be for a flash application.

Figure 5:
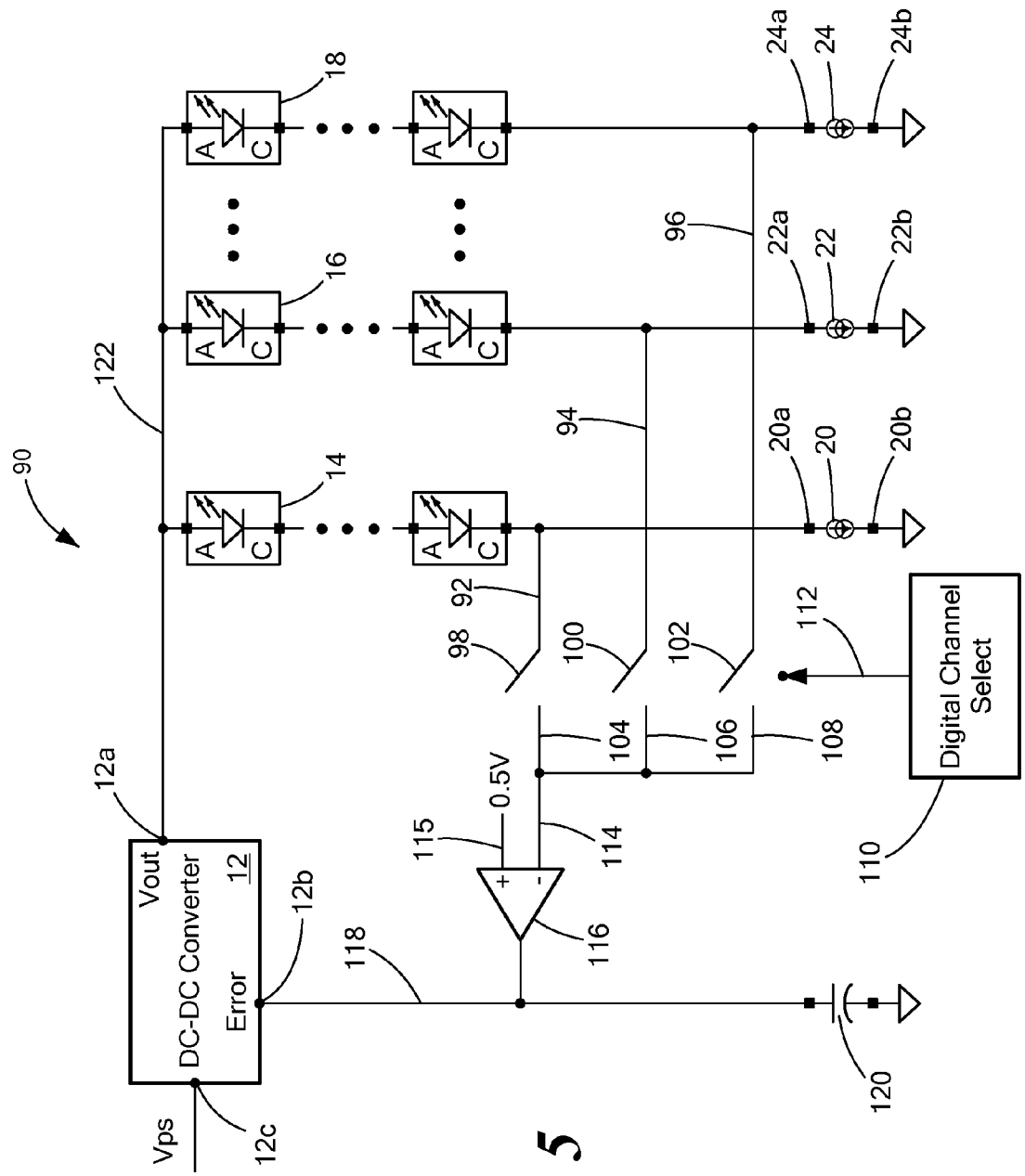
FIG. 5 is a schematic diagram of another electronic circuit for driving a diode load, the electronic circuit having a controllable DC-DC converter, current regulators, and a plurality of switches coupled to an error amplifier configured to provide an error signal to control an output voltage generated by the controllable DC-DC converter.

Referring now to FIG. 5, in which like elements of FIG. 1 are shown having like reference designations, an exemplary electronic circuit 90 includes switches 98, 100, 102, coupled to receive voltage signals 92, 94, 96, respectively. The voltage signals 92, 94, 96 can be the same as or similar to the voltage signals 26, 28, 30, respectively, of FIG. 1. The switches are also coupled to receive a control signal 112 generated by a digital channel select module 110, which causes the switches 98, 100, 102 to close sequentially and periodically, one at a time, for substantially equal periods, resulting in sequential and periodic voltage signals 104, 106, 108, which directly combine into a composite signal 114. In one particular arrangement, the control signal 112 has a frequency of about one hundred kilohertz.

An error amplifier 116 is coupled to receive the composite signal 114 at an inverting input node, to receive a reference voltage 115, for example, 0.5 volts, at a non-inverting input node, and configured to generate an error signal 118. In some arrangements, the error amplifier 116 is a transconductance amplifier, which provides a current-type output.

The circuit 90 can include a capacitor 120 coupled to the output node of the error amplifier 116. The capacitor 120 can be comprised of a parallel combination of output capacitance of the error amplifier 116 in parallel with the input capacitance of the error node 12b of the controllable DC-DC converter 12. However, in some other arrangements, the capacitor 120 can include another capacitor as well. In one particular arrangement, the capacitor 120 has a value of about one hundred picofarads. The capacitor 120 can provide a loop filter and can have a value selected to stabilize a feedback control loop.

The output stage (not shown) of the amplifier 116 can be configured to provide a larger current in one direction than in the other direction. In other words, the output stage of the amplifier 116 can source more current than it can sink, or vice versa. With this arrangement, for example, if the amplifier 116 can source more current than it can sink, and if the error signal 118 is lower in voltage than one of the voltage signals 104, 106, 108 attempts to generate during its associated time periods within the composite signal 114, the amplifier 118 responds by driving the error signal 118 higher, giving dominance to the lowest one or more of the voltage signals 104, 106, 108.

An amplifier with asymmetrical output current drive capability can be fashioned by way of asymmetrically sized output transistors in an output stage of the amplifier.

The controllable DC-DC converter 12 is coupled to receive the error signal 118 at the error node 12b of the controllable DC-DC converter 12. The controllable DC-DC converter 12 is also coupled to receive the power supply voltage, Vps, at the input node 12c and to generate a regulated output voltage 122 at the output node 12a in response to the error signal 118. It should be recognized that the regulated output voltage 122 can be the same as or similar to the regulated output voltage 38 of FIG. 1. However, since the error signal 118 is generated in a different way than the error signal 34 of FIG. 1, the regulated output voltage 122 need not be exactly the same as the regulated output voltage 38.

With this arrangement, the controllable DC-DC converter 12 is primarily controlled by a lowest one or more of the voltage signals 104, 106, 108 and other ones of the voltage signals 104, 106, 108 can have less influence. Thus, a voltage signal 92, 94, 96 that would otherwise be too low to provide proper operation of an associated one of the current regulators 20, 22, 24 will result in an increase in the error signal 118, tending to raise the regulated output voltage 122 of the controllable DC-DC converter 12.

With this arrangement, the controllable DC-DC converter 12 is controlled predominantly by one or more of the voltage signals 104, 106, 108 having the lowest voltage. However, other ones of the voltage signals 104, 106, 108 also contribute to the error signal 118, but with less influence.

A particular desired value of the regulated output voltage 38 is described above in conjunction with FIG. 1, and the same particular desired value applies in the same way to the regulated output voltage 122. The above described error signal 118, which is dominated by a lowest one or more of the voltage signals 104, 106, 108, approximately achieves the particular desired value of the regulated output voltage 122.

Certain elements of the circuit 90 can be within a single integrated circuit. For example, in some arrangements, the current regulators 20, 22, 24, the switches 104, 106, 108, the digital channel select circuit 110, the amplifier 116, the capacitor 120, and some internal elements of the controllable DC-DC converter 12 (described more fully above in conjunction with FIG. 2) can be within the single integrated circuit.

In some alternate arrangements, the error amplifier 116 can be replaced by a comparator coupled to a digital integrator (or a counter) that generates a weighted sum of the outputs from the comparator associated with closures of the switches 98, 100, 102. In other alternate arrangements, the error amplifier 116 can be replaced by a comparator, which generates an output signal that takes on a zero state (requesting a lower regulated output voltage 122) only when all of the current regulators 20, 22, 24 are determined to be properly regulating.

In some alternate embodiments, the current regulators 20-24, which are shown to be coupled to the bottom (cathode) ends of the series connected LED strings 14-18, respectively, can instead be at to top (anode) ends of the series connected LED strings 14-18, respectively. In these embodiments, the input nodes 20a-24a are coupled to receive the regulated output voltage 38, and output nodes 20b-24b are coupled to the anode ends of the series connected LED strings 14-18, respectively. Furthermore, in these embodiments, the switches 98-102 are coupled to the output nodes 20b-24b, which become the voltage sense nodes in place of the input nodes 20a-24a, and the non-inverting input of the error amplifier 116 is coupled to receive a different reference voltage.

The circuit 90 has advantages over the prior art. For example, the circuit 90 avoids the necessity for the above-described minimum select circuit, which can result in less integrated circuit die area. Furthermore, for embodiments in which the error amplifier 116 has an asymmetrical output drive capability as described above, a loop gain of the circuit 90 tends to change (e.g., drop) as more of the current regulators 20, 22, 24 come into regulation, i.e., receive sufficiently high voltage signals 92, 94, 96. The lower gain of the loop results in a drop of the error signal 118 as soon as any of the current regulators 20, 22, 24 begin to regulate. For embodiments in which the controllable DC-DC converter 12 is a boost switching regulator (described more fully below in conjunction with FIG. 2), this tends to improve feedback loop stability and reduce overshoot and ringing that might occur during any voltage step, for example, at turn on of the circuit 90.

Figure 6:
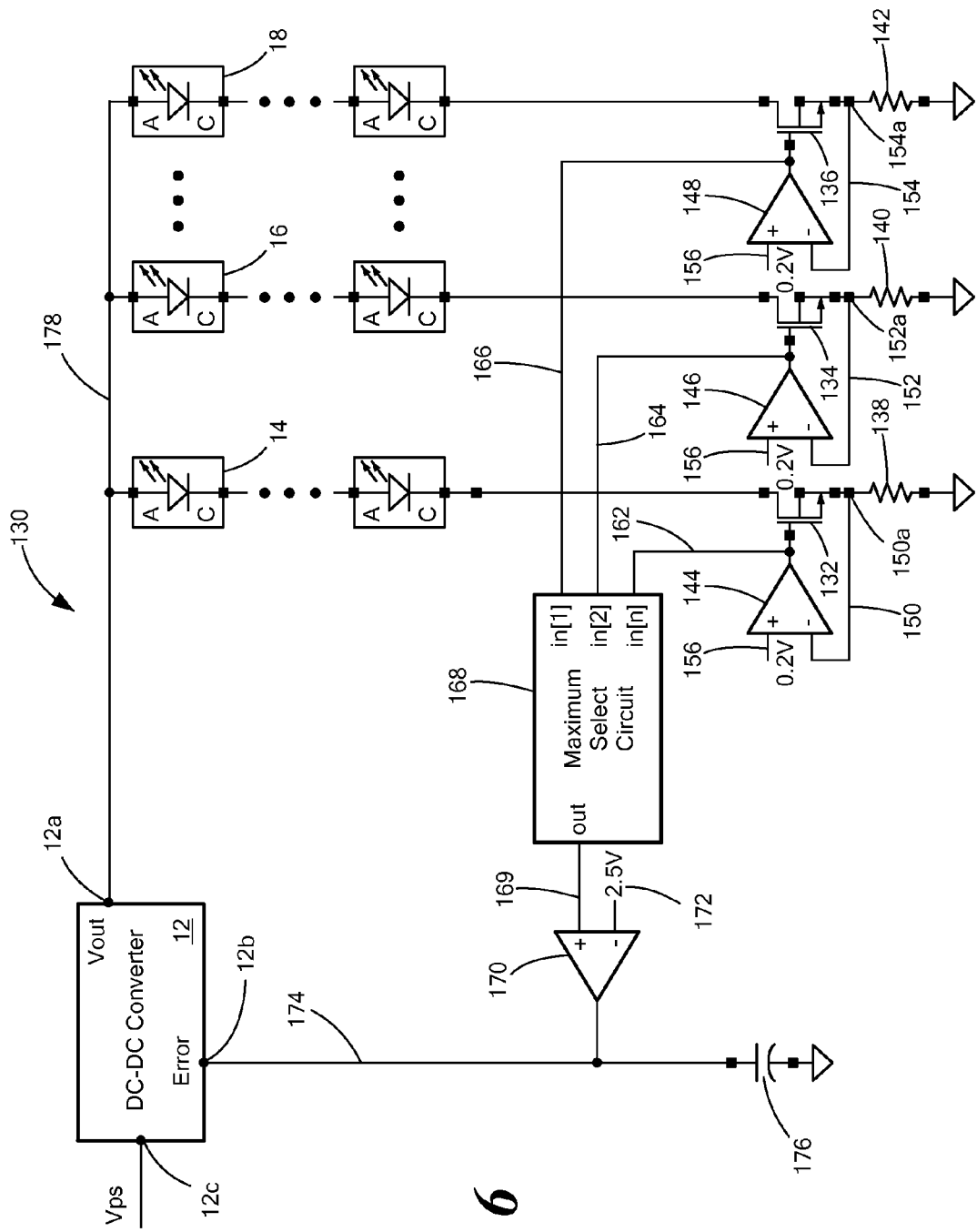
FIG. 6 is a schematic diagram of another electronic circuit for driving a diode load, the electronic circuit having a controllable DC-DC converter, current regulators including FETs and associated current sense circuits, a maximum select circuit, and an error amplifier configured to provide an error signal to control an output voltage generated by the controllable DC-DC converter.

Referring now to FIG. 6, in which like elements of FIG. 1 are shown having like reference designations, an exemplary electronic circuit 130 includes FETs 132, 134, 136, having drains coupled to cathode ends of the series connected LED strings 14, 16, 18, respectively. Sources of the FETs 132, 134, 136 are coupled to one end of resistors 138, 140, 142, respectively, forming respective current sense nodes 150a, 152a, 154a, at which feedback signals 150, 152, 152 are generated.

The feedback signals 150, 152, 154 are coupled to inverting input nodes of amplifiers 144, 146, 148, respectively. A reference voltage signal 156, for example, 0.2 volts, is coupled to the non-inverting input nodes of each one of the amplifiers 144, 146, 148. The resistors 138, 140, 142 in combination with the respective amplifiers 144, 146, 148 are referred to herein as current sense circuits.

It should be appreciated that the feedback signal 150a, 152a, 154a are representative of currents flowing through the resistors 138, 140, 142, respectively. The feedback signals 150a, 152a, 154a, are therefore, not representative of voltages appearing at inputs of current regulators (e.g., 20, 22, 24 of FIG. 1).

Amplifiers 144, 146, 148 are configured to generate voltage signals 162, 164, 166, respectively. It will be recognized that the voltage signals 162, 164, 166 are voltage signals that have voltage values representative of currents flowing through the FETs 132, 134, 136, respectively. The voltage signals 162, 164, 166, are, therefore, also not representative of voltages appearing at inputs of current regulators (e.g., 20, 22, 24 of FIG. 1).

It is described above in conjunction with FIG. 1, that it is desirable to maintain a voltage at each one of the current regulators 20, 22, 24 that is sufficiently high to allow proper operation of the current regulators 20, 22, 24. One or more of the current regulators 20, 22, 24 receive a lowest voltage. Accordingly, in the circuit 130, one or more of the FETs receive a voltage signal 162, 164, 166 having a highest voltage. The highest voltage is representative of one or more of the current regulators 20, 22, 24 being turned on the most and being nearest to improper operation (i.e., shut off).

Accordingly, the voltage signals 162, 164, 166 are received by a maximum select circuit 168, which is configured to select a highest one of the voltage signals 162, 164, 166 and to pass through the highest one as the highest voltage signal 169. Exemplary maximum select circuits are described more fully below in conjunction with FIGS. 7 and 8.

An error amplifier 170 is coupled to receive the highest voltage signal 169 at a non-inverting input node. The error amplifier 170 is also coupled to receive a reference voltage signal 172, for example, 2.5 volts, at an inverting input node. The error amplifier 170 is configured to generate an error signal 174 coupled to the error input node 12b of the controllable DC-DC converter 12. The error amplifier 170 can have an output stage (not shown) with relatively equal source and sink capabilities. In some arrangements, the error amplifier 170 is a transconductance amplifier, which provides a current-type output.

The circuit 130 can include a capacitor 176 coupled to the output node of the error amplifier 170. The capacitor 176 can be comprised of a parallel combination of output capacitance of the error amplifier 170 in parallel with the input capacitance of the error node 12b of the controllable DC-DC converter 12. However, in some other arrangements, the capacitor 176 can include another capacitor as well. In one particular arrangement, the capacitor 176 has a value of about one hundred picofarads. The capacitor 176 can provide a loop filter and can have a value selected to stabilize a feedback control loop.

The controllable DC-DC converter 12 is coupled to receive the error signal 174 at the error node 12b of the controllable DC-DC converter 12. The controllable DC-DC converter 12 is also coupled to receive the power supply voltage, Vps, at the input node 12c and to generate a regulated output voltage 178 at the output node 12a in response to the error signal 174. It should be recognized that the regulated output voltage 178 can be the same as or similar to the regulated output voltage 38 of FIG. 1. However, since the error signal 174 is generated in a different way than the error signal 34 of FIG. 1, the regulated output voltage 178 need not be exactly the same as the regulated output voltage 38.

With this arrangement, the controllable DC-DC converter 12 is primarily controlled to keep all of the FETs 132, 134, 136 out of saturation, i.e., to keep a highest one of the voltage signals 162, 164, 166 below a desired value, while maintaining currents through the resistors 138, 140, 142 at a predetermined value. Each one of the amplifier, FET, and resistor groups, for example the amplifier 144, the FET 132, and the resistor 138, operate as a current regulator, for which proper operation is maintained by controlling a highest one of the voltage signals 162, 164, 166 by adjusting the regulated output voltage 178 to be just high enough (which can include a margin, for example, a one volt margin).

A desired largest error signal 174 achieves linear operation of the FET 132, 134, 236 associated with the series connected LED string 14, 16, 18 having the largest voltage drop. In one particular embodiment, the desired largest error signal 174 is four volts or less, in accordance with an amplifier 144, 146, 148 capable of generating an output signal 162, 164, 166 of five volts or less.

A particular desired value of the regulated output voltage 38 is described above in conjunction with FIG. 1, and the same particular desired value applies in a similar way to the regulated output voltage 178. The above described error signal 174 approximately achieves the particular desired value of the regulated output voltage 178.

Certain elements of the circuit 130 can be within a single integrated circuit. For example, in some arrangements, the FETs 132, 134, 136, the resistors 138, 140, 142, the amplifiers 144, 146, 148, the maximum select circuit 168, the error amplifier 170, the capacitor 176, and some internal elements of the controllable DC-DC converter 12 (described more fully above in conjunction with FIG. 2) can be within the single integrated circuit.

In some alternate embodiments, the FETs 132-136, the resistors 138-142, and the amplifiers 144-148, which are shown to be at the bottom ends of the series connected LED strings 14-18, respectively, can instead be at the top ends of the series connected LED strings 14-18, respectively.

The circuit 130 has advantages over the prior art. In operation, the circuit 130 is able to regulate the controllable DC-DC converter 12 to achieve a regulated voltage 178 that assures that none of the FETs 132, 134, 136 go into current starvation, i.e., they can regulate current as desired. In contrast, use of the above-described minimum select circuit in prior art results in a desired regulated output voltage 178 able to provide enough voltage to associated current regulators. As described above, with the prior art arrangement, a voltage margin, e.g., one volt, is often used to assure than none of the associated current regulators will be current starved. Thus, the prior art tends to waste some power in the current regulators by way of the voltage margin, whereas the circuit 130 can operate without a margin or with a smaller margin.

Figure 7:
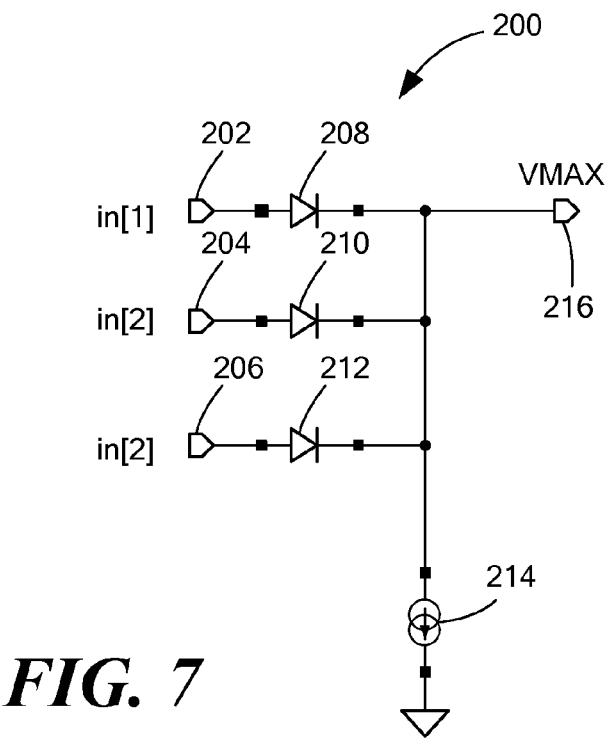
FIG. 7 is a schematic diagram of an exemplary maximum select circuit that can be used as the maximum select circuit of FIG. 6.

Referring now to FIG. 7, a circuit 200 can be used as the maximum select circuit 168 of FIG. 6. The circuit 200 includes three input nodes 202, 204, 206 coupled to respective cathode ends of diodes 208, 210, 212. Anode ends of the diodes 208, 210, 212 are coupled together to an input node of a current regulator 214 and to an output node 216 of the circuit 200.

It will be appreciated that an output signal VMAX appearing at the output node 216 is a largest one of input signals appearing at the input nodes 202, 204, 206.

Figure 8:
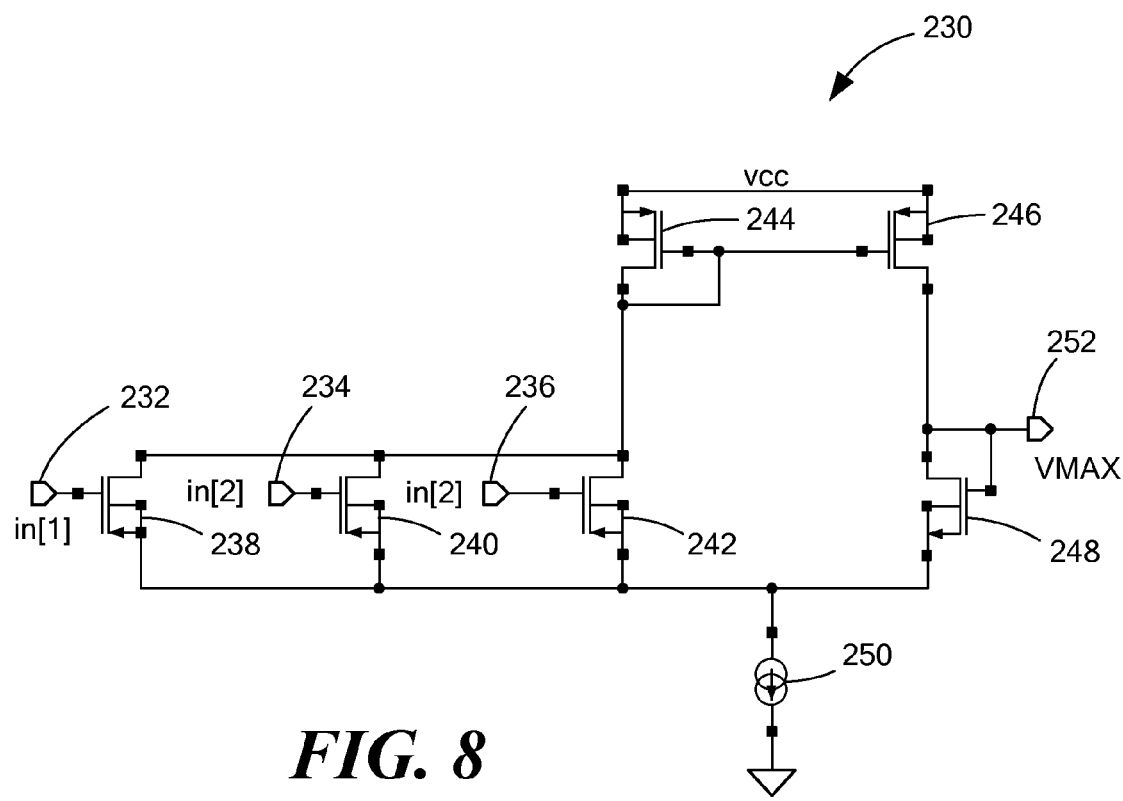
FIG. 8 is a schematic diagram of another exemplary maximum select circuit that can be used as the maximum select circuit of FIG. 6.

Referring now to FIG. 8, another circuit 230 can be used as the maximum select circuit 168 of FIG. 6. The circuit 230 includes three input nodes 232, 234, 236 coupled to gates of respective FETs 238, 240, 242. Drains of the FETs 238, 240, 242 are coupled together and to a source of a FET 244. Sources of the FETs 238, 240, 242 are coupled together and to an input node of a current regulator 250. A gate of the FET 244 is coupled to a gate of a FET 246 and also to the source of the FET 244. A source of the FET 246 is coupled to an output node 252 of the circuit 230. The output node 252 is coupled to a gate and a drain of a FET 248. A source of the FET 248 is coupled to the input node of the current regulator 250.

It will be appreciated that an output signal VMAX appearing at the output node 252 is a largest one of input signals appearing at the input nodes 238, 240, 242.

Figure 9:
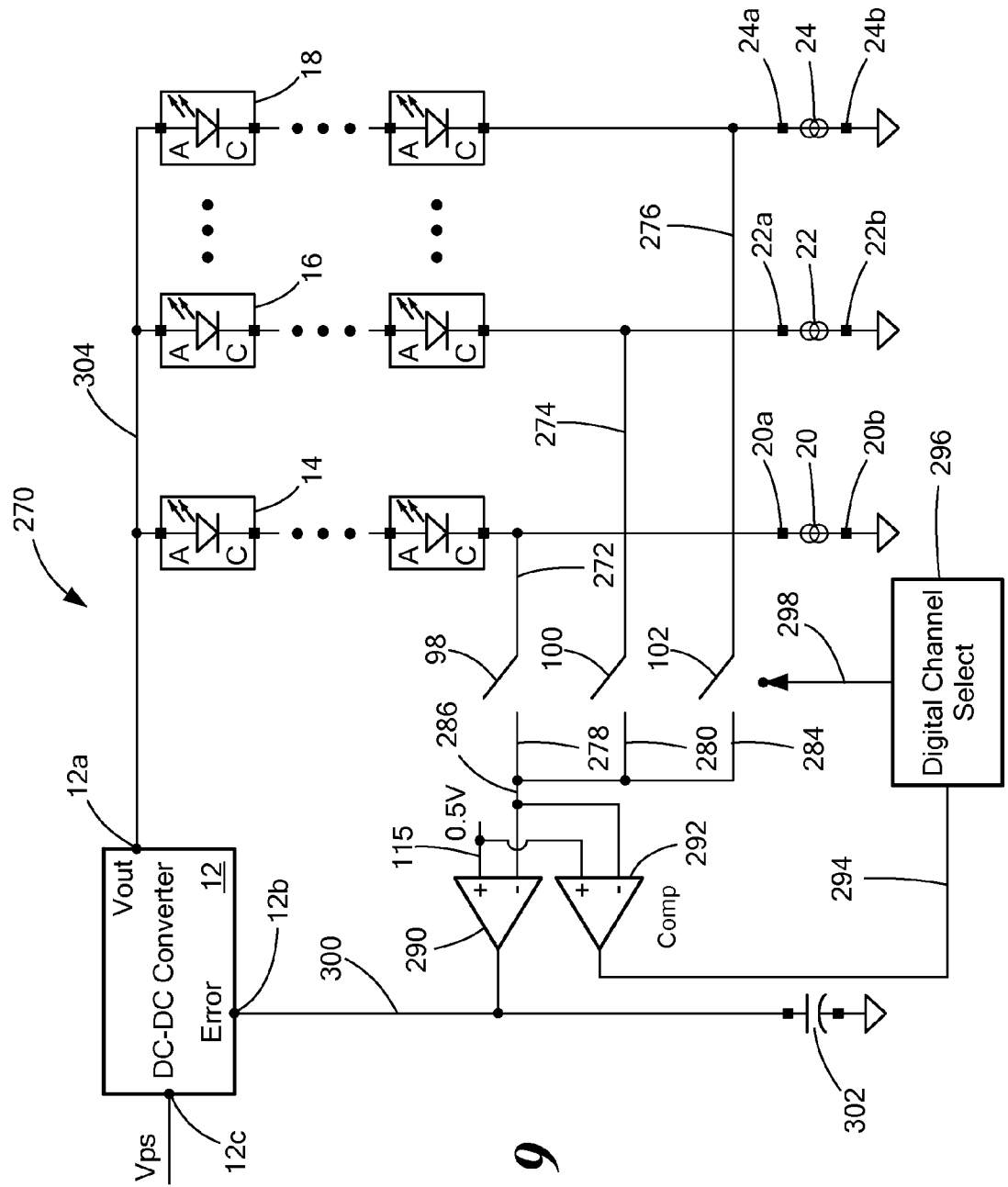
FIG. 9 is a schematic diagram of another electronic circuit for driving a diode load, the electronic circuit having a controllable DC-DC converter, current regulators, a comparator, and a plurality of switches coupled to an error amplifier configured to provide an error signal to control an output voltage generated by the controllable DC-DC converter.

Referring now to FIG. 9, in which like elements of FIGS. 1 and 5 are shown having like reference designations, an exemplary electronic circuit 270 includes the switches 98, 100, 102, coupled to receive voltage signals 272, 274, 276 respectively. The voltage signals 272, 274, 276 can be the same as or similar to the voltage signals 26, 28, 30, respectively, of FIG. 1 or the voltage signals 92, 94, 96 of FIG. 5. The switches 98, 100, 102 are also coupled to receive a control signal 298 generated by a digital channel select module 296, which causes the switches 98, 100, 102 to open and close, but in a different way than the digital channel select module 110 of FIG. 5. Operation of the digital channel select module 296 is described more fully below.

An error amplifier 290 is coupled to receive a composite signal 286 at an inverting input node, to receive the reference voltage 115, for example, 0.5 volts, at a non-inverting input node, and configured to generate an error signal 300. Unlike the error amplifier 116 of FIG. 5, an output stage (not shown) of the error amplifier 290 can be configured to provide currents with generally symmetrical drive capability in both directions. In some arrangements, the error amplifier 290 is a transconductance amplifier, which provides a current-type output.

The circuit 270 can include a capacitor 302 coupled to the output node of the error amplifier 116. The capacitor 302 can be comprised of a parallel combination of output capacitance of the error amplifier 290 in parallel with the input capacitance of the error node 12b of the controllable DC-DC converter 12. However, in some other arrangements, the capacitor 302 can include another capacitor as well. In one particular arrangement, the capacitor 302 has a value of about one hundred picofarads. The capacitor 302 can provide a loop filter and can have a value selected to stabilize a feedback control loop.

The controllable DC-DC converter 12 is coupled to receive the error signal 300 at the error node 12b of the controllable DC-DC converter 12. The controllable DC-DC converter 12 is also coupled to receive the power supply voltage, Vps, at the input node 12c and to generate a regulated output voltage 304 at the output node 12a in response to the error signal 300. It should be recognized that the regulated output voltage 304 can be the same as or similar to the regulated output voltage 38 of FIG. 1 or the regulated output voltage 122 of FIG. 5. However, since the error signal 300 is generated in a different way than the error signal 34 of FIG. 1 and the error signal 118 of FIG. 5, the regulated output voltage 304 need not be exactly the same as the regulated output voltages 38, 122.

The electronic circuit 270 can also include a comparator 292, having one input node coupled to receive the reference voltage 115 and another input node coupled to receive the composite signal 286. The comparator 294 is configured to generate a comparison signal 294, which is received by the digital channel select module 296.

In operation, the digital channel select module 296 selects particular channels, one at a time, and closes the switches 98, 100, 102, one at a time, accordingly. The digital channel select module 296 keeps the selected switch closed for at least some predetermined minimum time, for example, one microsecond. Both the error amplifier 290 and the comparator 294 are coupled to receive one of the voltage signals 272, 274, 276 in accordance with the selected one of the switches 98, 100, 102. The selected one of the switches 98, 100, 102 remains closed until such time as the associated one of the current regulators 20, 22, 24 achieves proper current regulation, i.e., until its associated voltage signal 272, 274, 276 is sufficiently high. When the associated one of the current regulators 20, 22, 24 achieves proper current regulation, then the digital channel select module 296 switches to a next channel, i.e., selects a different one of the switches 98, 100, 102 to close. Operation of the digital channel select module 296 continues in this way, continuously sequencing through the switches 98, 100, 102.

With this arrangement, due in-part to averaging provided by the capacitor 302, the controllable DC-DC converter 12 is primarily controlled by a lowest one or more of the voltage signals 272, 274, 276, which tends to receive a longest closure of an associated one of the switches 98, 100, 102, and other ones of the voltage signals 272, 274, 276 can have less influence. Thus, a voltage signal 272, 274, 276 that would otherwise be too low to provide proper operation of an associated one of the current regulators 20, 22, 24 will result in an increase in the error signal 300, tending to raise the regulated output voltage 304 of the controllable DC-DC converter 12.

With this arrangement, the controllable DC-DC converter 12 is controlled predominantly by one or more of the voltage signals 272, 274, 276 having the lowest voltage. However, other ones of the voltage signals 272, 274, 276 also contribute to the error signal 300, but with less influence.

A particular desired value of the regulated output voltage 38 is described above in conjunction with FIG. 1, and the same particular desired value applies in the same way to the regulated output voltage 302. The above described error signal 300, which is dominated by a lowest one or more of the voltage signals 272, 274, 276, approximately achieves the particular desired value of the regulated output voltage 304.

Certain elements of the circuit 270 can be within a single integrated circuit. For example, in some arrangements, the current regulators 20, 22, 24, the switches 104, 106, 108, the digital channel select circuit 296, the error amplifier 290, the comparator 292, the capacitor 302, and some internal elements of the controllable DC-DC converter 12 (described more fully above in conjunction with FIG. 2) can be within the single integrated circuit.

In some alternate arrangements, the error amplifier 290 can be replaced by a comparator coupled to a digital integrator (or a counter) that generates a weighted sum of the outputs from the comparator associated with closures of the switches 98, 100, 102. In other alternate arrangements, the error amplifier 290 can be replaced by a comparator, which generates an output signal that takes on a zero state (requesting a lower regulated output voltage 304) only when all of the current regulators 20, 22, 24 are determined to be properly regulating.

In some alternate embodiments, the current regulators 20-24, which are shown to be coupled to the bottom (cathode) ends of the series connected LED strings 14-18, respectively, can instead be at to top (anode) ends of the series connected LED strings 14-18, respectively. In these embodiments, the input nodes 20a-24a are coupled to receive the regulated output voltage 38, and output nodes 20b-24b are coupled to the anode ends of the series connected LED strings 14-18, respectively. Furthermore, in these embodiments, the switches 98-102 are coupled to the output nodes 20b-24b, which become the voltage sense nodes in place of the input nodes 20a-24a, and the non-inverting input of the error amplifier 290 is coupled to receive a different reference voltage.

The circuit 270 has advantages over the prior art. For example, the circuit 270 avoids the necessity for the above-described minimum select circuit, which can result in less integrated circuit die area.

The arrangements of FIGS. 1, 3, 4, 5, 6, 7, 8, and 9 are indicative of three series connected strings of light emitting diodes. However, it will be appreciated that other circuits can be expanded or contracted to accommodate more than three or fewer than three series connected strings of light emitting diodes, including one series connected string of light emitting diodes.

As described above, the arrangements of FIGS. 1, 4, 5, 6, and 9 show the regulated output voltage of the controllable DC-DC converter 12 coupled to the anode ends of the series connected LED strings 14, 16, 18, and current regulators (e.g., 20, 22, 24, FIG. 1) or other components 132, 134, 136, FIG. 6) coupled between the cathode ends of the series connected LED strings 14, 16, 18 and ground. It will be appreciated that other similar arrangements are also possible, for which the regulated output voltage of the controllable DC-DC converter 12 is instead coupled to the current regulators and the current regulators are in turn coupled to the anode ends of the series connected LED strings 14, 16, 18, which are coupled at their cathode ends to ground. Furthermore, still other arrangements are possible for which the regulated output voltage of the controllable DC-DC converter 12 is a negative voltage.

All references cited herein are hereby incorporated herein by reference in their entirety. Having described preferred embodiments of the invention, it will now become apparent to one of ordinary skill in the art that other embodiments incorporating their concepts may be used.

It is felt therefore that these embodiments should not be limited to disclosed embodiments, but rather should be limited only by the spirit and scope of the appended claims.

What is claimed is:

1. An electronic circuit for driving a plurality of series connected light emitting diode strings with a controllable DC-DC converter, the electronic circuit comprising;
   a plurality of current regulators, each having a respective input node and a respective output node, the input node or the output node coupled to an end of a respective one of the plurality of series connected light emitting diode strings, wherein each current regulator is configured to pass a respective predetermined current through the respective one of the plurality of series connected light emitting diode strings to which it is coupled;
   a plurality of switches, each having a respective input node, a respective output node, and a respective control node, wherein each one of the input nodes of the plurality of switches is coupled to the input node or the output node of a respective one of the plurality of current regulators, wherein the output nodes of the plurality of switches are coupled together resulting in a composite signal;
   a digital channel select circuit coupled to the control nodes of the plurality of switches and configured to close each one of the plurality of switches sequentially and periodically; and
   an error amplifier having an input node and an output node, wherein the input node of the error amplifier is coupled to receive the composite signal, wherein the error amplifier is configured to generate an error signal at the output node of the error amplifier.

2. The electronic circuit of claim 1, wherein the error amplifier is configured to be able to sink a different amount of current than it is able to source.

3. The electronic circuit of claim 1, wherein the controllable DC-DC converter is coupled to receive the error signal, wherein the controllable DC-DC converter comprises an input node configured to receive a voltage and an output node at which regulated output voltage is generated by the controllable DC-DC converter, wherein the error signal is configured to control the regulated output voltage.

4. The electronic circuit of claim 3, wherein the controllable DC-DC converter comprises a switching regulator.

5. The electronic circuit of claim 4, wherein the error amplifier is configured to be able to sink a different amount of current than it is able to source.

6. The electronic circuit of claim 1, wherein the error amplifier comprises a transconductance amplifier.

7. A method of driving a plurality of series connected light emitting diode strings with a controllable DC-DC converter, the method comprising:
   attempting to pass a respective predetermined current through each one of the plurality of series connected light emitting diode strings, resulting in a respective voltage appearing at an end of each one of the plurality of series connected light emitting diode strings;
   sampling each one of the voltages sequentially and periodically to generate voltage samples; and
   summing the voltage samples to generate an error signal to control the DC-DC converter.

8. The electronic circuit of claim 6, further comprising a capacitor coupled to the output node of the error amplifier forming a loop filter.

9. The method of claim 7, wherein the summing the voltage samples comprises:
   summing the voltage samples with an error amplifier.

10. The method of claim 9, wherein the error amplifier comprises a transconductance amplifier.

11. The method of claim 10, further comprising filtering the error signal to form a loop filter.

12. The method of claim 7, wherein the controllable DC-DC converter is coupled to receive the error signal, wherein the controllable DC-DC converter comprises an input node configured to receive a voltage and an output node at which regulated output voltage is generated by the controllable DC-DC converter, wherein the error signal is configured to control the regulated output voltage.

13. The method of claim 12, wherein the controllable DC-DC converter comprises a switching regulator.

14. The method of claim 13, wherein the summing the voltage samples comprises:
   summing the voltage samples with an error amplifier.

15. The method of claim 14, wherein the error amplifier comprises a transconductance amplifier.

16. The method of claim 15, further comprising filtering the error signal to form a loop filter.

* * * * *